Nov. 5, 1963 T. M. JULOW 3,109,346
MEANS FOR FASTENING TELESCOPING MEMBERS
Filed June 30, 1961 2 Sheets-Sheet 1

INVENTOR.
THOMAS M. JULOW
BY
William P. Hickey
ATTORNEY

Nov. 5, 1963 T. M. JULOW 3,109,346
MEANS FOR FASTENING TELESCOPING MEMBERS
Filed June 30, 1961 2 Sheets-Sheet 2

INVENTOR.
THOMAS M. JULOW
BY
William P. Hickey
ATTORNEY

United States Patent Office 3,109,346
Patented Nov. 5, 1963

3,109,346
MEANS FOR FASTENING TELESCOPING MEMBERS
Thomas M. Julow, South Bend, Ind., assignor to The Bendix Corporation, a corporation of Delaware
Filed June 30, 1961, Ser. No. 121,229
1 Claim. (Cl. 92—98)

The present invention relates to a new and improved configuration for telescoping members which will automatically lock the members when they are telescoped together; and more particularly to diaphragm type fluid pressure motors formed by telescoping housing sections which automatically lock into sealing engagement with the power diaphragm when the telescoping housing sections are slid together.

Numerous configurations have been proposed heretofore for the mating portions of telescoping members by reason of which the telescoping portions hold themselves in a locked or assembled telescoped arrangement. One such arrangement is shown in the G. E. Kellogg Patent 2,969,046 wherein a quite complicated configuration is shown for holding the telescoping members in assembled condition. The arrangement disclosed by this patent involves a configuration wherein the outer telescoping member has portions which are bent radially outwardly and pierced to provide slots which are positioned radially outwardly of the remaining sections of the outer telescoping member. This arrangement is very difficult to produce, inasmuch as it requires a complicated set of dies to bend the outer telescoping member radially outwardly, and at the same time pierce the outer telescoping member. A simpler arrangement, and one which is much more easily and inexpensively produced, is shown in the Price et al. application 39,932 filed June 30, 1960, and which is assigned to the assignee of the present invention. In the arrangement taught by the Price et al. application, the outer telescoping member is deformed radially inwardly at spaced points, and the inner telescoping member is notched out or scalloped to receive the indentations in the outer member. With this arrangement the members are telescoped together and then rotated relative to each other to bring the portions between the scallops behind the indented portions of the outer telescoping member. The arrangement taught by the Price et al. application is much more easily produced than is that of the Kellogg patent inasmuch as the dies for forming the outer member work inwardly to provide the desired configuration of the outer member in one simple stamping operation.

One of the difficulties of the configuration shown in the prior art structures above referred to, however, is that the inner telescoping member must be rotated while exerting considerable axial pressure on the rubber diaphragm that is interpositioned between the two telescoping members. A further disadvantage occurs in the prior art structures by reason of the fact that some suitable locking means must be used to prevent inadvertent counter-rotation and thus disassembly of the telescoping members. In the Price et al. application, for instance, there is provided an axially outwardly extending tab which slides past the inwardly deformed portions of the outer telescoping member during assembly to prevent counter-rotation of the parts. In order to disassemble the parts in the Price et al. application, it is necessary to apply sufficient axial force between the members to deform the rubber diaphragm portion sufficiently to move the tab past the deformed portions in the outer telescoping member.

An object of the present invention is the provision of a new and improved configuration for telescoping members which will lock the telescoping members in assembled relationship as the telescoping members are forced axially together, and without a subsequent rotation of the members.

Another object of the present invention is the provision of a new and improved configuration for telescoping members which will permit their disassembly without the aid of a press or fixture for axially squeezing the parts together during the unlocking operation.

A still further object of the present invention is the provision of a new and improved configuration for telescoping members which will permit the members to be disassembled by merely sequentially prying the deformed portions of the outer member clear of the periphery of the inner telescoping member.

The invention resides in certain constructions and combinations and arrangements of parts; and further objects and advantages of the invention will become apparent to those skilled in the art to which it relates from the following description of the preferred embodiment described with reference to the accompanying drawings forming part of this specification, and in which.

Figure 1:
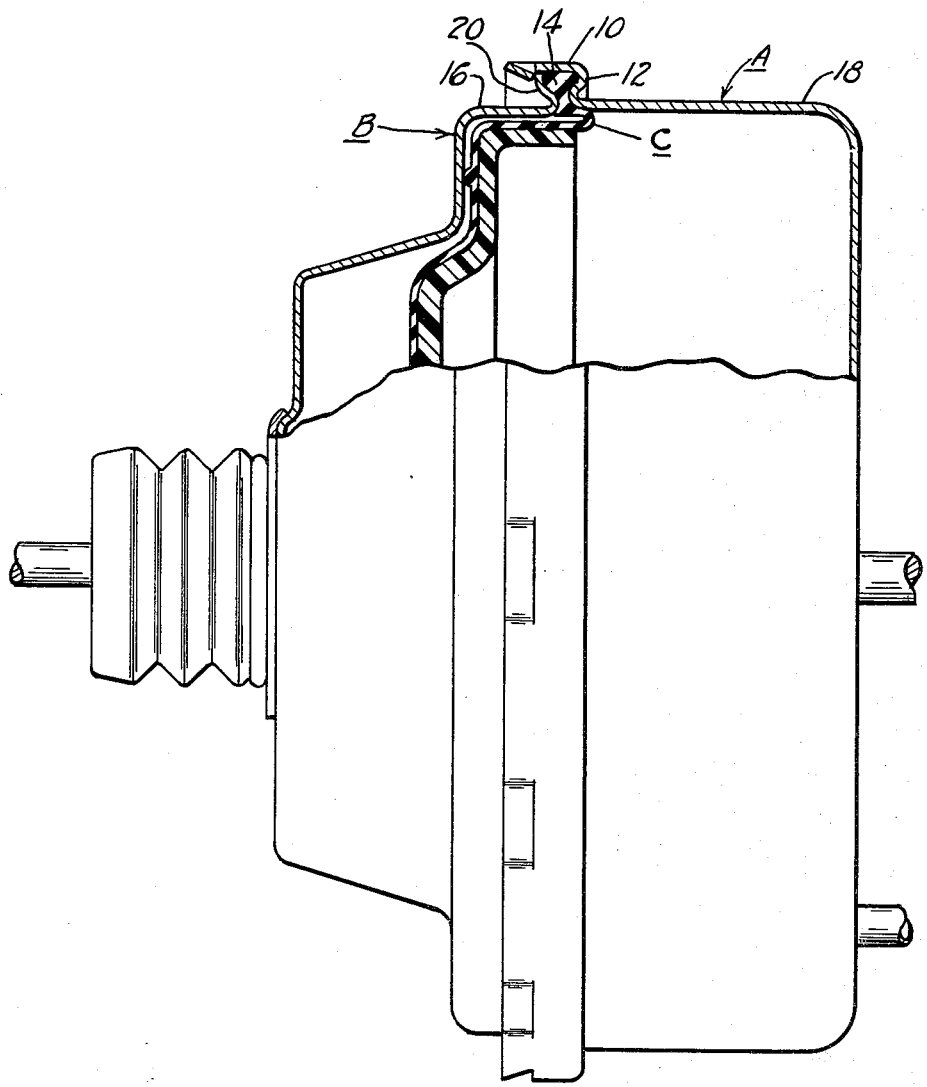
FIGURE 1 is a side elevational view of a shell or housing of a fluid pressure servomotor having a portion broken away to better show the configuration of the telescoping housing sections by reason of which the sections are held together.

While the present invention will have utility in securing any type of telescoping members together, it has particular advantages in fluid pressure motors having diaphragms whose outer periphery must be sealingly clamped to the outer shell of the fluid pressure motor. The fluid pressure motor shown in the drawings is of the same general type as that seen in the previously referred to Price et al. application or in the Robert R. Hager application 98,472 filed March 27, 1961. The fluid pressure servomotor shown in the drawing is of the type used to power actuate the hydraulic braking system of an automotive vehicle, and has a shell which is formed in two stamped sections A and B, and between which the outer periphery of a flexible diaphragm C is sealingly clamped. The outer stamped shell section A is a generally cup-shaped member, the sidewalls 10 of which are bent generally radially outwardly adjacent its open end and then axially forwardly again to provide a suitable shoulder 12 against which the outer bead 14 of the diaphragm C may be sealingly pressed. The inner shell section B forms a generally cup-shaped cover member for the servomotor housing, and has a short section of cylindrical sidewalls 16 which is generally coextensive with the cylindrical sidewalls 18 of the outer shell section A. The outer edge of the cover section B is turned generally radially outwardly from its short cylindrical section 16 to provide a shoulder 20 for compressing the bead 14 against the opposite shoulder 12 of the shell section A. As shown in the drawing the outer periphery of the shoulder 12 is cylindrical and has a sliding fit with respect to the inside surface of the sidewall section 10 of the shell section A.

According to principles of the present invention, the sidewall section 10 adjacent the outer edge of the shell section A is slotted as at 22 at a plurality of spaced points about its periphery 12 as shown in the drawing). The portions of the shell section 10 between the slots 22 and its outer edge 24 are bent angularly inwardly to provide tab portions 26 whose inner edge 28 formed by its slot 22 will abut the outer surface of the shoulder 20 of the other shell section B. The outer edge 24 of the tab portions 26 remain substantially in its original position so that the shoulder 20 of the cover member B will abut the inclined inner surface 30 of the tab portion 26 when the sections A and B are telescoped together. Telescopic movement of the members A and B therefore will cause the outer edge of the shoulder 20 to ride down the inclined inner surface 30 of the tab portions 26 until the shoulder 20 slides past the inner edge 28 of the tab portion 26; whereupon the shoulder 20 slides outwardly behind the inner edge 28 to lock the sections A and B together. The outer bead 14 of the diaphragm C is formed of such a thickness as to provide a predetermined gasketing pressure between the shoulders 12 and 20 at the time that the shoulder 20 is locked into position behind the inner edge 28 of the tab 26 so as to provide a satisfactory vacuum tight seal between the diaphragm 6 and shell sections A and B. Shoulders 12 and 20 are preferably provided with re-entry portions 32 and 34 adjacent their respective cylindrical sections 18 and 16, so as to neck down the radially inner portion of the cavity provided by the shoulders 12 and 20 to prevent the pulling out of the bead 14 from between the assembled shell sections A and B.

Figure 2:
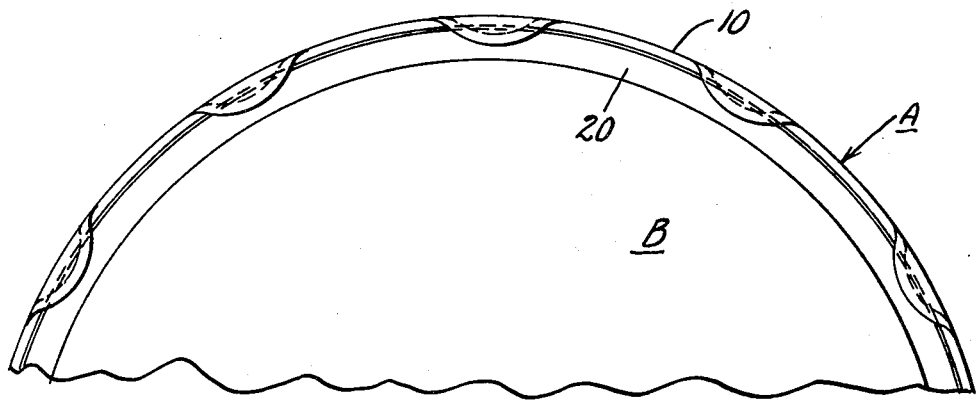
FIGURE 2 is a fragmentary end view of the fluid pressure servomotor shown in FIGURE 1.
Figure 3:
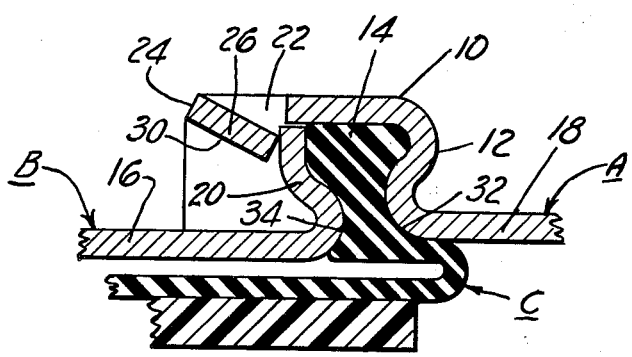
FIGURE 3 is an enlarged fragmentary cross sectional view showing the locking configuration of the telescoping portions seen in FIGURES 1 and 2.

Inasmuch as both the shell sections A and B are made from approximately the same thickness of material both the ramps 26 and cylindrical sections 16 will deform somewhat as the members are telescoped together prior to the time that the shoulder 20 snaps behind the inner edge 28 of the tabs 26. Where one or the other of the shell sections A and B must be made of a thicker or more rigid material than is the other of the telescoping members, the other of the members must be made flexible enough to permit the shoulder 20 to ride past the inner edge 28 of the tab portions 26. In the embodiment shown in the drawing, the cylindrical section 16 of the cover member B is made quite rigid by reason of its shoulder 20 so that most of the deformation which takes place during assembly occurs in the tab portions 26. As best seen in FIGURE 2 of the drawings, the tab portions 26 have a generally conical shape to provide the desired inclined inner surface 30 by means of gradually changing radii. This conical configuration can be provided in a manner similar to that taught by the Wesstrom application Serial No. 112,741 filed May 1, 1961 excepting that the shape of the radially inwardly moving punches will be conical instead of cylindrical.

It has been found that the configuration taught by the present invention can be disassembled by placing a tip of a screwdriver over the outer surface of the section 16 of the cover member B to pry the inner edge 28 of the tab portion 26 outwardly of the shoulder 20 whereupon the gasketing pressure on the bead 14 forces the outer periphery of the shoulder 20 outwardly beneath the ramp surface 30 to hold the tab portion 26 in its unlocked condition. Thereafter the same operation may be performed on the adjacent tab 26, and the operation repeated until a sufficient number of tabs have been unlocked to permit the cover section B to be withdrawn.

It will be apparent that the objects heretofore enumerated as well as others have been accomplished and that there has been provided a configuration for telescoping members which permits them to lock themselves together without the use of additional fastening means and without the necessity of a twisting or turning action during the locking operation. The invention further making possible the unlocking of the structure without the aid of a press or fixture, and by means of a simple prying operation which can be sequentially performed on its tab portions.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

In a fluid pressure servomotor and the like: a stamped open ended sheet metal shell forming an axially extending internal chamber of predetermined cross section, abutment means around the internal periphery of said shell and spaced a predetermined distance from said open end of said shell, said shell being slit at generally equally spaced intervals around the periphery of said shell a predetermined distance outwardly of said abutment means to provide preformed tab portions of said shell between said slits and the open end of said shell, said tab portions being twisted radially inwardly adjacent its slit so that its inner edge formed by said slit projects into said internal chamber and so that the outer edge remains substantially unchanged in its peripheral position whereby the internal surface of said tab portions form an internal ramp, an end cover plate having a peripheral dimension greater than that prescribed by said inner edge of said tab and having a sliding fit with respect to the inside predetermined cross section of said shell, said end cover plate having a portion adjacent the peripheral dimension normal to said inner edge, and a movable wall in said chamber and having a diaphragm portion the outer edge of which is resilient and of greater cross-section than the space between the inner edge of said tab and the abutment means of the shell such that said cover plate is forced outwardly to contact said inner edge and seal the shell and cover plate to form said servomotor when, said cover plate is pressed axially inwardly over said ramps.

References Cited in the file of this patent
UNITED STATES PATENTS

| | | |
|---|---|---|
| 1,485,136 | House | Feb. 26, 1924 |
| 2,254,559 | Andresen | Sept. 2, 1941 |
| 2,742,785 | St. Clair | Apr. 24, 1956 |